April 13, 1926.
A. E. CARMAN
1,580,582
SPOON SUPPORTING MEANS
Filed April 17, 1925
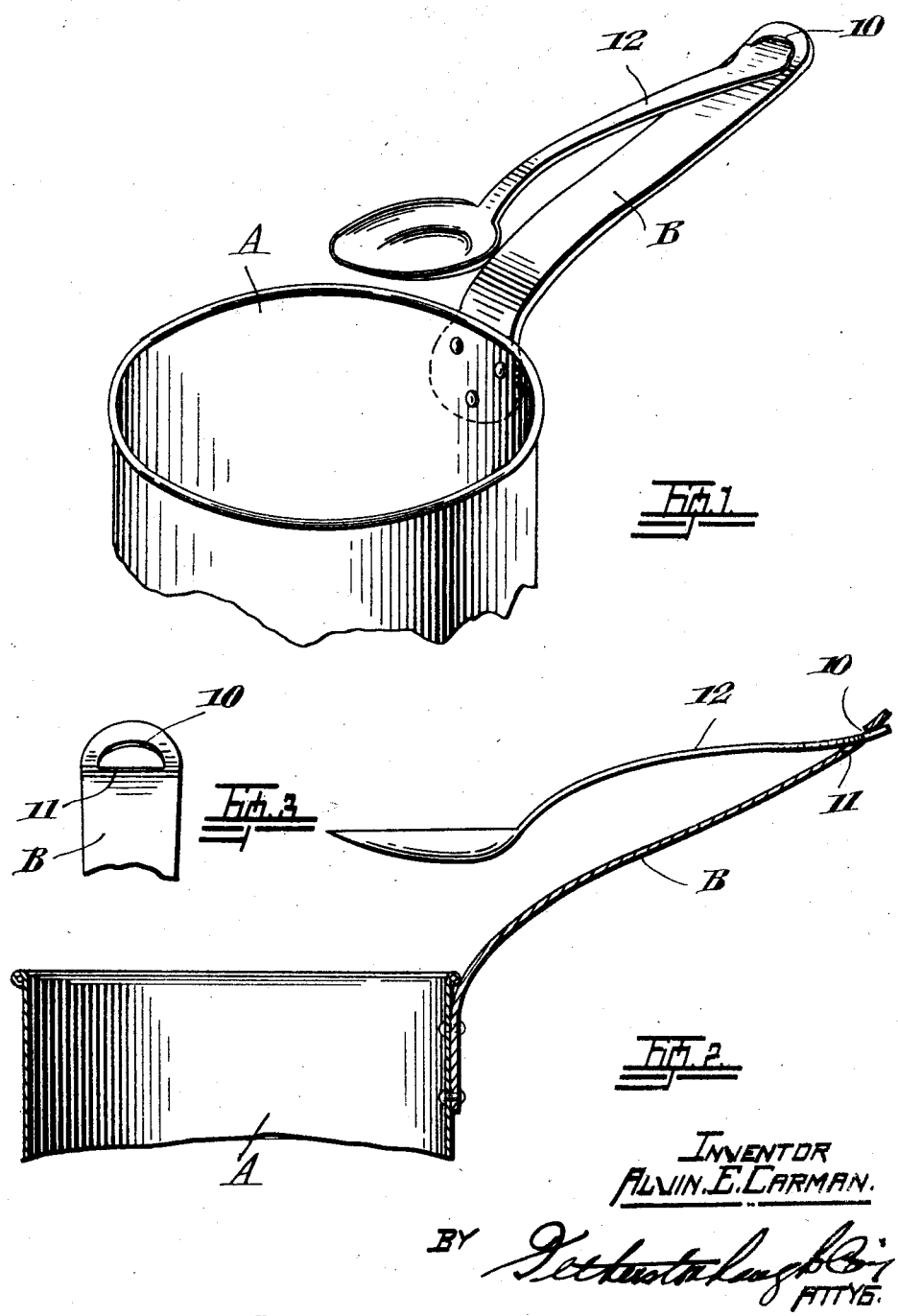
INVENTOR
ALVIN E. CARMAN.
BY
ATTYS.

Patented Apr. 13, 1926.

1,580,582

UNITED STATES PATENT OFFICE.

ALVIN ERNEST CARMAN, OF CALGARY, ALBERTA, CANADA.

SPOON-SUPPORTING MEANS.

Application filed April 17, 1925. Serial No. 23,921.

*To all whom it may concern:*

Be it known that I, ALVIN ERNEST CARMAN, a subject of the King of Great Britain, and resident of the city of Calgary, in the Province of Alberta and Dominion of Canada, have invented certain new and useful Improvements in Spoon-Supporting Means, of which the following is a specification.

This invention relates to improvements in combined spoon-supporting and suspending means for vessels, particularly for kitchen utensils, and the objects of the invention are to provide simple and efficient means formed in the handle of a kitchen utensil adapted to detachably support a spoon and whereby, when not in use, the vessel or utensil can be hung up.

Further objects are the provision of means of this description whereby a spoon can be conveniently supported on the handle of a kitchen utensil where it will be convenient to cooking operations and where it can be detachably retained without becoming overheated.

Still further objects are the provision of means in the handle of a cooking utensil adapted to conveniently support a spoon when not in use and in such a way that the spoon will not become overheated or interfere with the cover of the vessel or container.

With the foregoing and other objects in view, the invention consists essentially in providing adjacent the outer extremity of the handle of a cooking utensil a sloped slot adapted to engage with and retain the handle of a spoon and to hold it ready for use in connection with the food or the like that is being cooked in the utensil.

Referring now to the drawings, in which like characters of reference indicate corresponding parts in each figure:

Figure 1 is a perspective view of a kitchen utensil of any well known make formed with a spoon detachably carried thereby;

Figure 2 is a longitudinal section;

Figure 3 is a detail of the slot formed in the handle of the cooking utensil adapted to engage with the extremity of the spoon handle.

Referring now more particularly to the drawings, A designates a kitchen utensil provided with the usual handle B having adjacent the outer end a transversely extending semi-circular slot 10 preferably formed with a sloping base 11 and adapted to engage with and detachably retain the handle 12 of an ordinary spoon and whereby the spoon, the handle of which extends through the slot 10, is, as illustrated in Figure 2, retained in the handle B of the cooking utensil, clear of the top of the cooking utensil and clear of its handle. In other words, the spoon is practically suspended in the handle of the cooking utensil and thus always ready for use and not liable to become overheated.

The advantages of having a spoon in connection with cooking, and the manipulation of cooking utensils, always at hand will be apparent.

From the foregoing it will be noted that my invention is adapted to the handle of any vessel, cooking utensil and the like, and that the opening there is adapted not only to support a spoon but, when the vessel is not in actual use, to enable it to be hung up. The advantages of being able to slip the end of the spoon into the handle of a cooking utensil and leave it there without the handle becoming overheated will be appreciated. A further advantage is that the dry end of the spoon or the like being the portion engaged, it is always ready for use to stir the contents of the container whereas, as compared with present conditions, when the contents of the container or cooking vessel are stirred or otherwise manipulated with a spoon or the like, the spoon is left down on some convenient place, and when it is necessary to use the spoon again the user often forgets where it is and has to get another. All these little delays and disadvantages are obviated through my simple and effective improvement which can be provided in any handle for containers and the like at practically no extra cost.

As many changes could be made in the above construction and many apparently widely different embodiments of my invention, within the scope of the claims, constructed without departing from the spirit or scope thereof, it is intended that all matter contained in the accompanying specification and drawings shall be interpreted as illustrative and not in a limiting sense.

What I claim as my invention is:

1. In containers and the like formed with handles, a semi-circular slot formed with a sloping base adjacent the outer end of the handle adapted to engage with the handle of a spoon or the like to support the latter in suspended position.

2. The combination with handled containers, kitchen utensils and the like, of means in the form of a semi-circular slot provided in said handles adjacent the outer ends thereof and designed to detachably engage with the end of a spoon handle to support a spoon in spaced relationship thereto.

3. A cooking utensil or the like having a handle, an opening therein adapted to detachably engage with the end of a spoon or the like to support the spoon in substantially horizontal position, said opening being of semi-circular formation with an outwardly sloped base.

In witness whereof I have hereunto set my hand.

ALVIN ERNEST CARMAN.